J. G. THORNBURGH.
ELECTRIC POWER SYSTEM.
APPLICATION FILED APR. 3, 1918.
1,345,566.  Patented July 6, 1920.
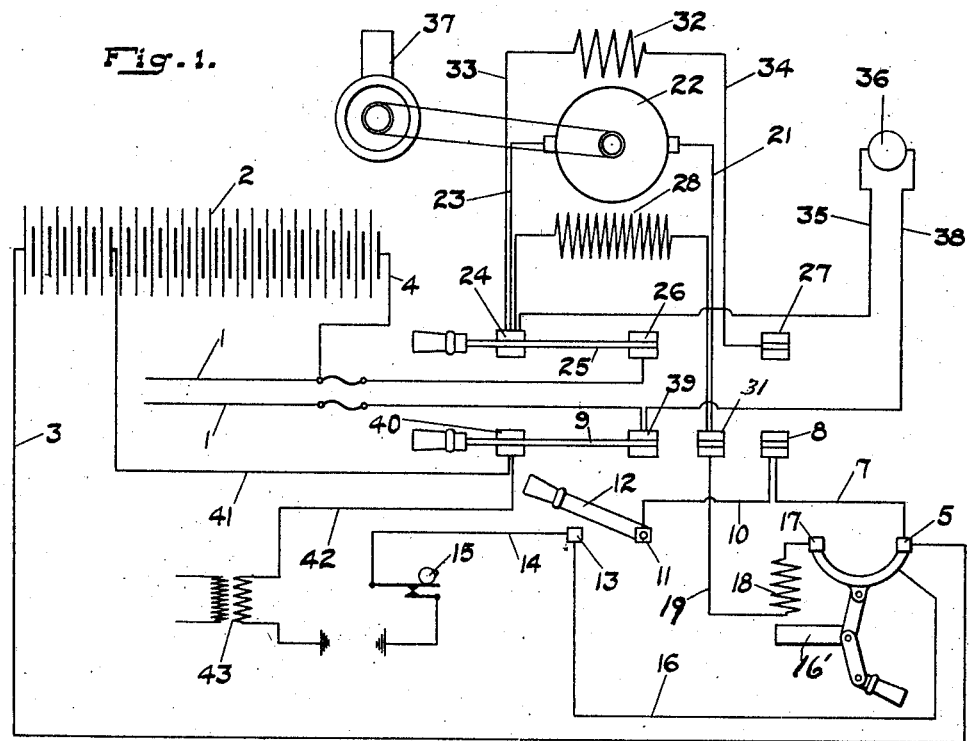
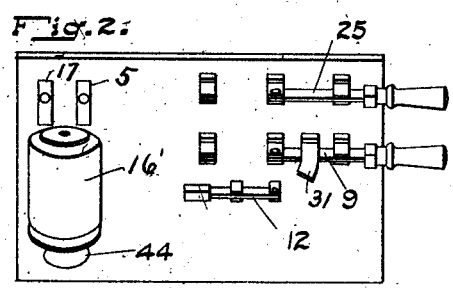
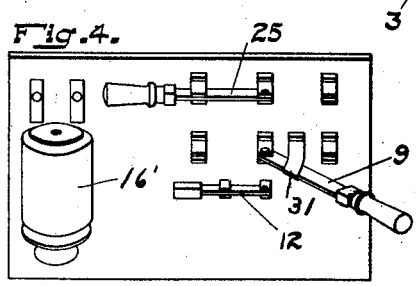
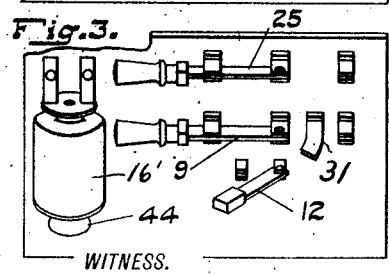
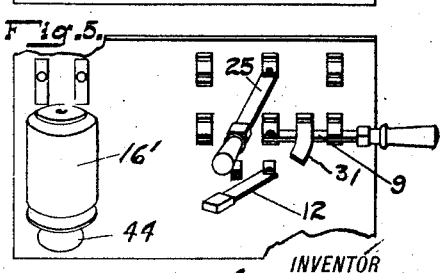
WITNESS.
*Walter H. Troemel.*
INVENTOR
*John Guy Thornburgh*
BY
*Bradford K. Daviede*
ATTORNEY.

UNITED STATES PATENT OFFICE.

JOHN GUY THORNBURGH, OF INDIANAPOLIS, INDIANA, ASSIGNOR TO SWARTZ ELECTRIC COMPANY, OF INDIANAPOLIS, INDIANA, A CORPORATION OF INDIANA.

ELECTRIC POWER SYSTEM.

1,345,566. Specification of Letters Patent. Patented July 6, 1920.

Application filed April 3, 1918. Serial No. 226,472.

*To all whom it may concern:*

Be it known that I, JOHN GUY THORNBURGH, a citizen of the United States, residing at Indianapolis, Marion county, and State of Indiana, have invented and discovered certain new and useful Improvements in Electric Power Systems, of which the following is a specification.

My invention relates to electric power systems, and particularly to those systems employing a plurality of sources of energy, such as a storage battery, a prime mover, and a dynamo electric machine adapted to operate as a motor or generator, and a load line to which current is to be supplied. The objects of the invention are to enable the employment of a simple form of means for cutting out of circuit and stopping one of the sources of energy, such as a dynamo electric machine, when the current demand in the battery or in the line falls below a predetermined amount, and to provide means coöperating with such circuit controlling means for permitting either the automatic operation described or for manually effecting the establishment of the circuit to the load line from the dynamo electric machine alone or from the battery alone.

With these objects, and others in view, my invention is embodied in preferable form in a system and arrangement hereinafter described and illustrated in the accompanying drawings.

In these drawings, Figure 1 is a diagrammatic view of the wiring circuit of the system; Fig. 2, a side view in elevation of the switch-board controlling the same and showing parts arranged in starting position; Fig. 3, a view similar to Fig. 2, showing the switches arranged in position to effect charging of the battery from the dynamo electric machine and to supply current to the load line; Fig. 4, a similar view showing the switches in position to supply current to the load line from the dynamo electric machine alone, and Fig. 5, a similar view showing the switches arranged to draw current from the battery alone for supply to the line.

Referring to the drawings, 1 indicates the load line, 2 the battery, 3 the positive battery lead and 4 the negative battery lead. The lead 3 connects with a contact 5 of a circuit breaker 16'. A line 7 connects this contact 5 with a switch terminal 8 of a knife blade switch of which 9 is the swinging arm. The terminal 8 connects by line 10 with a terminal 11 of a manually operated controlling switch 12 which in connection with the circuit which it controls, constitutes one of the essential features of the invention. This switch is in the ignition circuit, and is known as the ignition switch. The switch blade is adapted to close the ignition circuit through the terminal 13 which is connected on one side by line 14 to the timer 15 of the internal combustion engine employed as the prime mover and on the other side by line 16 with the shell of a circuit breaker 16'. The other fixed contact 17 of the circuit breaker is connected through the coil 18 thereof and line 19 to the terminal 31 of main switch 9, which by line 21 is connected to one side of the armature 22 of the dynamo electric machine which operates either as a motor or a generator. The other side of the armature is connected by line 23 with the terminal 24 of upper main switch 25, pivoted on terminal 26, and adapted also to contact with terminal 27. The shunt winding 28 of the dynamo electric machine is connected by lines with terminal 24 and with auxiliary terminal contact 31 controlled by switch arm 9 and which has a longer contact than that of terminal 8, whereby contact may be made with said terminal 31 independently of terminal 8. The series winding 32 of the dynamo electric machine is in the circuit 24, 33, 34, 27. Terminal 24 is also connected by line 35, with a voltage controlled governor 36 adapted to control the throttle of the prime mover 37, and leads by line 38, to the pole 39 of lower main switch 9 which pole is also connected to the main line 1.

A terminal 40 of switch 9 connects on one side by lead 41 with the negative side of a six cell unit of the battery, whereby ignition is obtained at the proper voltage by utilizing the required number of cells between the positive side of the battery and the intermediate point connected to lead 41, and also to supply the necessary load energy at the normal voltage of the load lines 1, when charging. The terminal 40 also connects by line 42 with the non-vibrating coil 43 of the ignition circuit.

The operation is as follows:—

*Starting*, (see Fig. 2).

For starting the switches are moved to the positions shown in Fig. 2. The lower main switch 9 is thrown to the right against both contacts 31 and 8. The ignition switch 12 is then closed, and the upper main switch 25 connected with terminal 27. The air is then choked off at the air valve on the carbureter of the engine. The core of the circuit breaker will be down.

The circuit will then be from battery 2, through lead 3, contact 5, line 7, terminal 8, switch 9, line 21, armature 22, line 23, terminal 24, line 33, series winding 32, line 34, terminal 27, switch arm, 25, terminal 26, and lead 4 to battery thus completing armature circuit also from terminal 31 through shunt winding 28 to terminal 24, back through line 33, series winding 32, line 34, contact 27, through switch 25, contact 26, line 4 to battery completing shunt circuit. Also from terminal 8, through line 10, switch arm 12, timer and ground back through coil 43, line 42, contact 40, line 41 to negative terminal of six cells of battery, thus completing ignition circuit. One line, 16 of circuit breaker shell is short circuited by switch 12.

By the establishment of these circuits the dynamo electric machine is started as a motor so as to thereby drive the prime mover, and the ignition elements for the engine put in action.

After the engine has become fully started, it overruns the dynamo electric machine causing the latter to run as a generator. Thereupon the switches are adjusted to any one of the positions indicated in Figs. 3 to 5 inclusive according to the mode of operation desired.

*Charging battery and supplying energy to load lines.*

Thus, if it is desired to both charge the battery and supply current to the line the switches are thrown to the position indicated in Fig. 3. The upper switch is thrown to the left to engage terminal 24, then the lower switch to the left to engage terminal 40, the circuit breaker core is pushed up by knob or handle 44 to engage contacts 5 and 17, and the ignition switch is pulled out to disconnect it from terminal 13, the ignition circuit remaining closed, however, through the circuit breaker. The condition of the circuits is also illustrated in Fig. 1. In this arrangement, energy for the load lines 1 is taken from negative battery lead 4, and an intermediate point on the battery through the lead 41.

With the ignition switch out, the circuit breaker is now capable of automatic operation to cut out the dynamo electric machine when the current demand in the line or battery falls below a predetermined amount. When this condition occurs, then the decrease of current through the circuit breaker will cause the core thereof to fall, breaking the connection with the contacts 5 and 17, and thereby breaking the ignition circuit at the contacts and stopping the engine and consequently the generator. When the engine stops, in order to take current from the full battery the switch is thrown against contacts 31 and 8. The system then continues to receive energy from the battery until the latter is discharged to the point where it is advisable to recharge, whereupon the "starting" and "charging" operations of the switches are repeated.

When the switches are in the positions indicated in Fig. 3, the circuit is as follows:—

From armature 22, line 21, contact 31, through winding of circuit breaker 18, contact 17, across circuit breaker to contact 5 through lead 3 to battery, from battery through lead 4 to contact 26, switch 25, contact 24, line 23, armature 22. The shunt circuit is from winding 28, to contact 31 through winding 18 of circuit breaker, contact 17 across circuit breaker to 5 through line 3 to battery. Then out of battery on line 4 to contact 26 switch 25, contact 24, shunt 28. The circuit of series winding 32 is open at 27. The voltage governor circuit is out of armature 22 through line 23, contact 24, line 35, governor 36, line 38, contact 39, switch 9, contact 40, lead 41, to battery on negative terminal of six cells. The ignition circuit is out of battery lead 3 circuit breaker contact 5 from shell of circuit breaker through line 16, to contact 13, line 14, through timer 15 to ground, from ground through coil 43, line 42, to contact 40, and through line 41 to six cells of battery. The line circuit is out of armature 22, through line 23, terminal 24, switch 25, contact 26 to line 1, back through outer line 1, to contact 39, to switch 9, contact 40, line 41 to battery in intermediate part thereof.

*Energy to line from generator alone.*

To supply the energy to the line from the generator alone, the upper switch 25 is thrown to the left to engage the terminal 24, the lower switch is thrown into engagement with the long contact 31 only, the circuit breaker is down, and the ignition switch is closed. This arrangement is illustrated in Fig. 4. In this case the battery is disconnected from the line.

This arrangement avoids drawing current from the battery, and also enables a battery to be dispensed with altogether, dry cells being employed for the starting ignition.

In this arrangement the ignition circuit is the same as defined with respect to Fig. 2; and the battery circuit is open at 8. The generator circuit goes from terminal 24 through switch 25 to line 1, back through other line 1, terminal 39 switch 9, terminal 31 to generator, the series winding 32 being cut out as in Fig. 3. The voltage governor in this case is across the terminals of the generator.

*Energy from battery alone.*

To supply energy from the battery alone to the line, the upper switch 25 is thrown out (see Fig. 5) the lower switch 9 to the right to engage both contacts, the ignition switch thrown out, and the circuit breaker remains down.

The circuit is then as follows:—

From battery through lead 4 to line 1, back through other line 1, to terminal 39, switch 9, terminal 8, line 7, terminal 5, line 3 to battery. The generator circuit is broken at terminal 24, and 27, and the ignition circuit broken at 13.

Having thus described my invention, what I claim is:—

1. In an electric power system, a dynamo electric machine operable as a motor or a generator, a prime mover, a battery, a load line, an ignition circuit, a plurality of manually controlled main switches, a manually controlled ignition circuit switch, means controlled by said switches for effecting the starting of the motor and prime mover, and for charging the battery from the generator and supplying power to the line, or for supplying power from the generator alone or the battery alone and means in the said ignition circuit, operable when the ignition switch is open for automatically cutting out the dynamo electric machine upon a predetermined decrease in current demand on the battery.

2. In an electric power system including a load line, a dynamo electric machine operable as a motor or a generator, a prime mover and a battery, a main battery circuit controlling switch, a main generator circuit controlling switch, an ignition switch, and contacts with which said generator switch coöperates for establishing circuit from the dynamo electric machine to the line, battery and one of said contacts being longer than the other to permit connection with the same independently of the other through the generator switch whereby power may be supplied from the generator alone independently of the battery, and means coöperating with said generator switch for completing a circuit from the generator to the battery and to the line.

3. In an electric power system, a dynamo electric machine, a prime mover, a storage battery, a load line, manually operated switches for establishing the power circuit, an ignition circuit, a manually operated switch for said ignition circuit, and electro magnetic circuit breaking and closing means manually closed, forming part of the ignition circuit and main line circuit and opened automatically upon a decrease in current demand in the line to break said ignition circuit.

4. In an electric power system, a dynamo electric machine operable as a motor or generator, a battery, a load line, a prime mover, an ignition circuit, an electro magnetic circuit breaker in the ignition circuit and battery circuit and a manually operated switch controlling the ignition circuit, said circuit breaker being operable automatically by a decrease in current demand on the line, to break the ignition circuit when the ignition switch is open.

In witness whereof, I have hereunto set my hand at Indianapolis this 23rd day of March, A. D. nineteen hundred and eighteen.

JOHN GUY THORNBURGH.

Witnesses:
C. K. BURDICK,
W. B. SEFTON.